United States Patent [19]

Hastings, III et al.

[11] Patent Number: 5,365,355
[45] Date of Patent: Nov. 15, 1994

[54] LIGHT BLOCKING, PIXEL ENHANCEMENT AND PHOTOCURRENT REDUCTION IN ACTIVE MATRIX LIQUID CRYSTAL DISPLAYS

[75] Inventors: William A. Hastings, III, Novato; William N. Buchele, Los Gatos, both of Calif.

[73] Assignee: WAH-III Technology Corporation, Novato, Calif.

[21] Appl. No.: 29,127

[22] Filed: Mar. 10, 1993

[51] Int. Cl.$^5$ .................. G02F 1/1343; G02F 1/1335
[52] U.S. Cl. .......................... 359/59; 359/70; 359/67; 359/87
[58] Field of Search .............. 359/59, 70, 67, 87, 359/54

[56] References Cited

U.S. PATENT DOCUMENTS

| | | | |
|---|---|---|---|
| 3,862,360 | 1/1975 | Dill et al. | 359/59 |
| 4,024,626 | 5/1977 | Leupp et al. | 437/60 |
| 4,103,297 | 7/1978 | McGreivy et al. | 359/87 |
| 4,191,452 | 3/1980 | Grinberg et al. | 359/71 |
| 4,239,346 | 12/1980 | Lloyd | 359/59 |
| 4,382,658 | 5/1983 | Shields et al. | 359/58 |
| 4,470,060 | 9/1984 | Yamazaki | 359/59 |
| 4,602,850 | 7/1986 | DeBenedetti | 359/57 |
| 4,839,707 | 6/1989 | Shields | 359/58 |

FOREIGN PATENT DOCUMENTS

| | | | |
|---|---|---|---|
| 63-313132 | 12/1988 | Japan | 359/59 |
| 2-245741 | 10/1990 | Japan | 359/59 |

OTHER PUBLICATIONS

"Liquid Crystal TV Displays: Principles and Applications . . . ," by E. Kaneko, D. Reidel Publishing Company, KTK Scientific Publishers/Tokyo, Chapter 7, (1987).

"Liquid Crystal MOS Matrix High Density Program," by Bleha et al., Final Technical Report, prepared for U.S. Army, Sep. 1, 1981, AD-A152987.

*Primary Examiner*—Anita Pellman Gross
*Attorney, Agent, or Firm*—Majestic, Parsons, Siebert & Hsue

[57] ABSTRACT

A back plate structure for a reflective type active matrix liquid crystal display and methods for forming the same, is described. The structure includes an array of reflective electrodes for selectively altering the molecular alignment of liquid crystal material confined above each of the reflective electrodes and an array of light shields spatially offset with the array of reflective electrodes so that the light shields block light passing through portions of gaps formed between adjacent reflective electrodes. Each of the reflective electrodes also has a corresponding light shield which is electrically connected to that reflective electrode so that the liquid crystal material confined above portions of the gaps between adjacent reflective materials can also be altered by the electrically connected light shields. The structure also includes a plurality of positively biased diffusion regions formed in areas where incident light is expected to strike the surface of the silicon substrate, where the positively biased diffusion regions act as electron "collectors" and the grounded silicon substrate acts as a hole "collector" for any electrons and holes generated by the photons of light striking the surface of the silicon substrate.

16 Claims, 6 Drawing Sheets

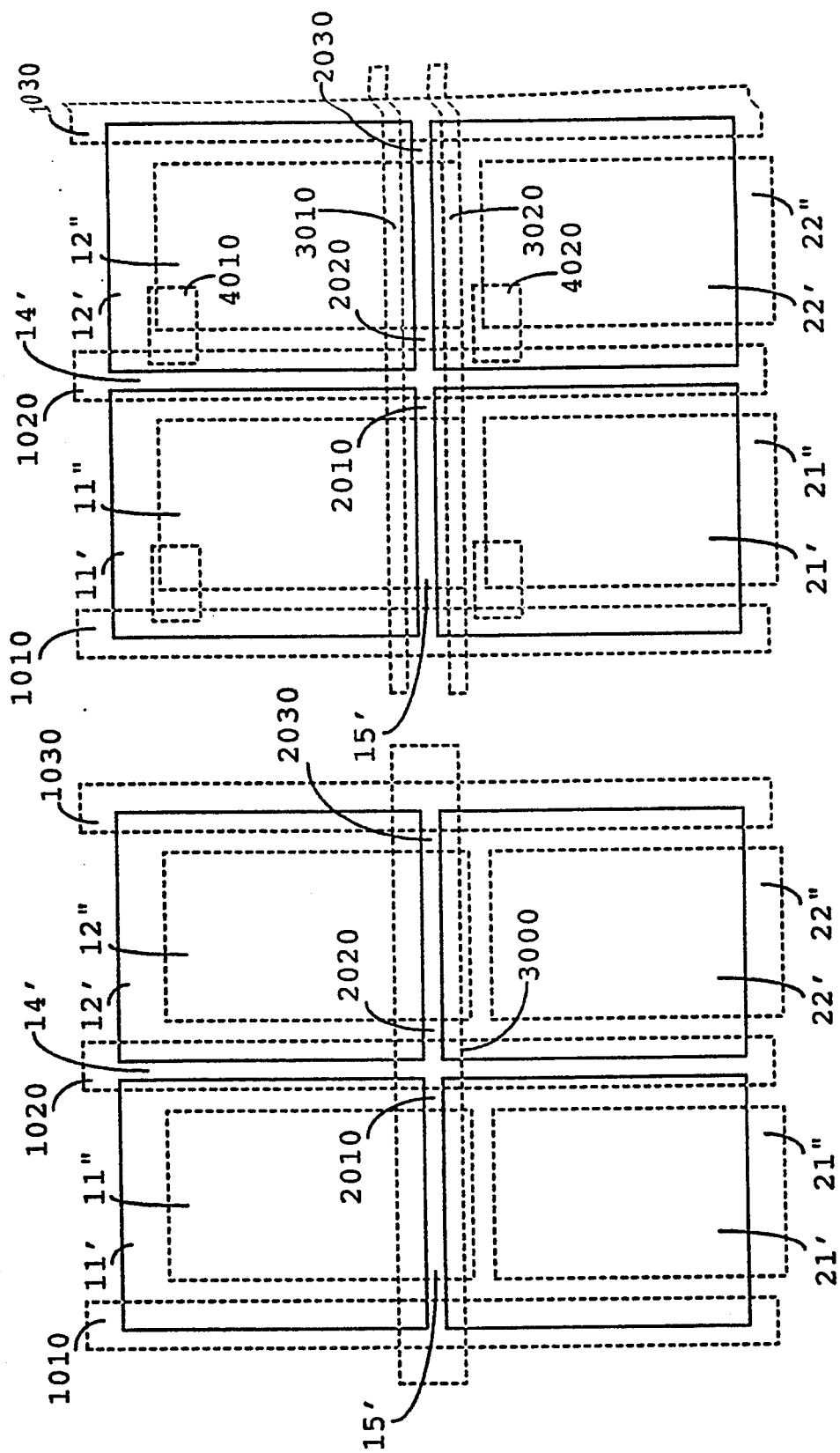

LIGHT BLOCKING, PIXEL ENHANCEMENT AND PHOTOCURRENT REDUCTION IN ACTIVE MATRIX LIQUID CRYSTAL DISPLAYS

BACKGROUND OF THE INVENTION

This invention relates in general to active matrix liquid crystal displays and in particular, to an active matrix liquid crystal display having light blocking, pixel enhancement, and photocurrent reduction features.

U.S. Pat. No. 3,862,360 issued to Dill et. al., describes one construction of an active matrix liquid crystal display ("AMLCD"). The AMLCD is formed by confining a thin layer of liquid crystal material between two plates. One plate is a glass (also referred to herein as "front plate"), which has one large transparent electrode formed on a surface adjacent to the confined liquid crystal material. The other plate, is a processed silicon substrate (also referred to herein as "back plate"), which has a plurality of reflective electrodes formed on a surface adjacent to the confined liquid crystal material.

The plurality of reflective electrodes define a plurality of pixels organized in a matrix array of rows and columns. To activate a pixel in the AMLCD, appropriate voltages are applied to a reflective electrode uniquely associated with that pixel and the front plate electrode. By applying such voltages to the reflective electrode and the front plate electrode, the molecular alignment of the liquid crystal material sandwiched between the two electrodes is altered. Depending upon the type of liquid crystal material being used, the material then acts as either a light valve or a light scattering medium to incident light entering through the front plate, passing through the liquid crystal material, and then being reflected back through the liquid crystal material and the front plate by the reflective electrode. For a general discussion on the structure and operation of such active matrix liquid crystal displays, see, e.g., Kaneko, E., *LIQUID CRYSTAL TV DISPLAYS*, KTK Scientific Publishers, Tokyo, 1987.

FIG. 1 illustrates an enlarged view of a portion of a front plate of an active matrix liquid crystal display (looking from the direction of entering incident light). Through the glass plate and its transparent electrode, the reflective electrodes (e.g., 11, 12, 21 and 22) can be seen on a silicon substrate 30. In laying out the reflective electrodes (e.g., 11, 12, 21 and 22) in an array of rows and columns on the silicon substrate 30, two key dimensions are the pixel pitch "PP" and the gap width "GW", as measured between adjacent reflective electrodes (e.g., 11 and 12).

Not shown in FIG. 1, but formed beneath each of the reflective electrodes (e.g., 11, 12, 21 and 22) is a field effect transistor ("FET") and a storage capacitor. The FET and storage capacitor associated with each reflective electrode, act together as an elemental sample and hold circuit for "sampling" a display signal transmitted to the source region of the FET through a signal electrode bus (also referred to herein as a "display signal bus") under the control of a row scanning signal transmitted to the gate electrode of the FET through a scanning electrode bus (also referred to herein as "row bus" or "gate bus"), and "holding" the voltage level of the display signal in the storage capacitor which is connected to the drain region of the FET, for the reflective electrode which is also connected to the drain region of the FET.

Gaps (e.g., 14) are required between each pair of adjacent reflective electrodes (e.g., 11 and 12) in order to electrically isolate the pair from each other. It is well known that for optimal viewing characteristics, the gap width "GW" should be minimalized and the smaller the ratio of the gap width "GW" to the pixel pitch "PP" the better. This is because the liquid crystal material over the gap areas is not controlled by the reflective electrodes and as a consequence, noticeable lines may appear on the display surface along these gap areas when the ratio of the gap width "GW" to the pixel pitch "PP" becomes too large.

Due to design and/or manufacturability limitations, each metallization process has a minimum gap width "GW" associated with that process. Because of this minimum gap width "GW" limitation, the gap width "GW" cannot continue to shrink proportionally with the pixel pitch "PP", as the pixel pitch "PP" gets smaller and smaller. Consequently, as the ratio of the gap width "GW" to the pixel pitch "PP" starts to increase, eventually, the ratio can become visually objectionable.

For example, in one metallization process, the minimum gap width "GW" might be 3.0 $\mu$m. Using this minimum gap width, when the pixel pitch is 300.0 $\mu$m, the gap width to pixel pitch ratio is only 1%, which makes the gap hardly noticeable visually. However, if the pixel pitch shrinks to 30.0 $\mu$m, then the gap width to pixel pitch ratio becomes 10%, which may make the gap objectionable visually.

Another problem created by large gap widths is that when incident light passes through the gaps (e.g., 14), photons of light strike the silicon substrate 30 and generate electrons and holes that can affect the proper operation of the FETs and storage capacitors associated with each of the reflective electrodes (e.g., 11, 12, 21 and 22). A number of approaches have been developed in the past to counteract the effects of this phenomena.

For example, U.S. Pat. No. 4,103,297 issued to McGreivy et. al., describes a method of heavily doping the processed surface of a silicon substrate to desensitize the surface against incident light. The method requires additional processing steps over those conventionally required to form an AMLCD. Briefly stated, the extra steps comprise the steps of masking the surface with a layer of photoresist so as to expose all but the areas in which the FETs will be formed, ion implanting the exposed portions, then removing the mask. Such additional steps, however, objectionably add to the cost of fabricating an AMLCD of the type described.

U.S. Pat. Nos. 4,239,346 and 4,602,850 issued to Lloyd and DeBenedetti, respectively, both describe forming a continuous sheet of metallization to shield the substrate from incident light. In both approaches, the continuous sheet of metallization is formed beneath the reflective electrodes of the AMLCD and above the silicon substrate of the AMLCD, so as to shield the substrate from incident light passing through the gaps between the reflective electrodes. To provide electrical connections to the reflective electrodes, an array of holes conforming to the array of reflective electrodes is formed in the continuous sheet of metallization such that at least one hole is made directly beneath each reflective electrode. Connections are then formed through each of the holes which connect each of the reflective electrodes to their respective drive circuitry on the silicon substrate. Lloyd thereupon suggests using its continuous sheet of metallization as a common ground plate for the storage capacitors associated with each of its reflective electrodes, and DeBenedetti suggests using its continuous sheet of metallization as a third electrode to bias the liquid crystal for faster response times when voltages are selectively applied to the individual reflective electrodes.

One undesirable aspect of the Lloyd approach is that the signal electrode buses which transmit display signals to each of the FETs of the reflective electrodes, are not formed of metal. In Lloyd, the signal electrode buses comprise parallel diffusion channels formed in the silicon substrate. Since these diffusion channels have considerably higher resistance-capacitance characteristics than metal, they form far slower transmission paths for the display signals. As a consequence, the refresh rate to update a frame of the AMLCD must be accordingly slower.

Although it is not known what the signal electrode buses are formed of in DeBenedetti, it is believed that they are most likely formed of parallel polysilicon strips on the surface of the silicon substrate. Since these polysilicon strips, like the diffusion channels of Lloyd, have considerably higher resistance-capacitance characteristics than metal, they form far slower transmission paths for the display signals and as a consequence, the refresh rate to update a frame of the AMLCD must be accordingly slower.

One technique for forming metallized signal electrode buses which is compatible with forming a continuous sheet of metallization as a light shield, is to form the signal electrode buses in a third metallization layer wherein a first metallization layer is used for the continuous sheet of metallization used as the light shield, and a second metallization layer is used for the reflective electrodes. A second technique of forming metallized signal electrode buses is to form the signal electrode buses in the same layer as the reflective electrodes. The advantage of this second technique over the first technique is that only two layers of metallization need be formed. Since the continuous sheet of metallization used as a light shield is continuous, the signal electrode buses cannot be formed in the same metallization layer as the continuous sheet of metallization.

Both of these techniques for forming metallized signal electrode buses are undesirable, however. The problem with the first approach is that a third metallization layer would substantially and objectionably add to the cost of fabricating an AMLCD of the type described, and the problem with the second approach is that forming the signal electrode bus on the same layer as the reflective electrodes would increase the gap width size between adjacent reflective electrodes and consequently, deteriorate the AMLCD's visual characteristics.

OBJECTS AND SUMMARY OF THE INVENTION

Accordingly, one object of the present invention is to provide a light blocking structure which prevents light passing through portions of gaps between adjacent reflective electrodes in an active matrix liquid crystal display from striking a silicon substrate beneath those portions of gaps, wherein the light blocking structure is compatible with metal signal electrode buses and does not require that a third layer of metallization be formed in the active matrix liquid crystal display.

Another object of the present invention is to provide an electrode structure which effectively reduces the visual lines caused by gaps formed between the adjacent rows and the adjacent columns of reflective electrodes in an active matrix liquid crystal display, wherein the effective lines resulting from such electrode structure have a width which is less than that of a minimum gap width allowable between adjacent metal parts for a metallization process used in forming the electrode structure.

Still another object of the present invention is to provide a "guard-band" structure which protects the field effect transistors and storage capacitors formed on a silicon substrate of an active matrix liquid crystal display from electrons and holes generated by photons of light striking and traveling along the surface of the silicon substrate, wherein such "guard-band" structure is formed without adding to the number of processing steps already being conducted in fabricating conventional active matrix liquid crystal displays of the type described previously.

These and additional objects are accomplished by the various aspects of the present invention, wherein briefly stated, one aspect of the present invention is a back plate structure for an active matrix liquid crystal display which includes a silicon substrate having a planar surface, an array of reflective electrodes having gaps between adjacent electrodes, and an array of light shields. The array of light shields is formed in an offset manner below the array of reflective electrodes such that a part of each of the light shields is directly under at least one gap in the array of reflective electrodes. With the array of light shields thus positioned relative to the array of reflective electrodes, portions of the surface of the silicon substrate are shielded from incident light passing through the gaps between the reflective electrodes.

Another aspect of the present invention is a back plate structure wherein each reflective electrode in an array of reflective electrodes has a corresponding light shield in an array of light shields formed between the array of reflective electrodes and a silicon substrate, wherein each corresponding light shield has a portion extending under at least one gap formed between its corresponding reflective electrode and a reflective electrode adjacent to its corresponding reflective electrode, and each pair of corresponding reflective electrodes and light shields is electrically connected together.

By thus electrically connecting each reflective electrode and its corresponding light shield together, the portion of the light shield overlapping the portion of the gap formed between its corresponding reflective electrode and a reflective electrode adjacent to its corresponding reflective electrode, alters the molecular alignment of the liquid crystal material over that portion of the light shield in the same manner as the liquid crystal material over that light shield's corresponding reflective electrode and consequently, with all such corresponding pairs of reflective electrodes and light shields connected together, the visual lines formed in the gap regions between adjacent rows of reflective electrodes and/or adjacent columns of reflective electrodes is effectively reduced.

Another aspect of the present invention is a back plate structure wherein metallized signal electrode and power buses are formed on the same layer of metallization as the light shields. By forming the metallized signal electrode and power buses on the same layer of metallization as the light shields, not only do signals being transmitted over these metal buses travel faster than they would over buses formed of diffusion channels or polysilicon, but also, only two layers of metallization are required, i.e., one layer for the signal electrode and power buses and the light shields, and a second layer for the reflective electrodes.

Another aspect of the present invention is a back plate structure wherein positively biased diffusion regions are selectively formed on a silicon substrate in areas where or near where incident light strikes the surface of the silicon substrate. By connecting these diffusion regions to a power supply bus and the silicon substrate to a ground bus, the positively biased diffusion regions act as collector or "guard-band" regions which "collect" the photo-generated electrons, and the grounded silicon substrate acts as a collector which "collects" or conducts away the photo-generated holes generated as photons of light strike the surface of the silicon substrate. The thus "collected" electrons and holes result in a small photo-current which is harmlessly conducted away from the FETs and storage capacitors formed on the silicon substrate.

Another aspect of the present invention is a method of forming a back plate structure for an active matrix liquid crystal display, comprising the steps of: forming, on a planar surface of a silicon substrate, a plurality of diffusion regions; forming, on a second planar surface, a plurality of power buses extending parallel to each other and a first plurality of gaps which electrically isolate each of the plurality of power buses from adjacent power buses; electrically connecting each of a first portion of said plurality of power buses to one of the plurality of diffusion regions, and each of a second portion of the plurality of power buses to the planar surface of the silicon substrate; and forming, on a third planar surface substantially parallel to and lying above said second planar surface, a plurality of reflective electrodes organized in an array of rows and columns, and a second plurality of gaps which electrically isolate adjacent reflective electrodes from each other; wherein the first and second plurality of gaps forming steps comprise the step of positioning the first plurality of gaps on the second planar surface and the second plurality of gaps on the third planar surface such that lines normal to the second and third planar surfaces that pass through both the first and second plurality of gaps also pass through the plurality of diffusion regions.

Still another aspect of the present invention is a method of forming a back plate structure for an active matrix liquid crystal display, comprising the steps of: forming, on a planar surface of a silicon substrate, a plurality of source regions; forming, on a second planar surface substantially parallel to and lying above the planar surface of said silicon substrate, a plurality of light shields organized in an array having gaps between adjacent light shields; forming, on a third planar surface substantially parallel to and lying above the second planar surface, a plurality of reflective electrodes organized in an array having gaps between adjacent reflective electrodes; electrically connecting each of the plurality of source regions to one of the plurality of reflective electrodes and one of the plurality of light shields; and wherein the plurality of light shields and plurality of reflective electrodes forming steps include the steps of positioning the array of light shields and array of reflective electrodes in an offset manner with respect to each other such that a part of each of the plurality of light shields is directly under portions of at least one gap in the array of reflective electrodes so as to shield a portion of the planar surface of the silicon substrate from incident light.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIGS. 2A–2E illustrate a preferred structure for forming the back plate of an active matrix liquid crystal display utilizing aspects of the present invention, wherein FIG. 2A is a top plan view of a portion of the back plate and FIGS. 2B–2E are cross-sectional cut-out views taken along lines 2B–2E, respectively, in FIG. 2A;

FIGS. 4A–4B illustrate alternative structures for forming the back plate of an active matrix liquid crystal display utilizing aspects of the present invention.

DESCRIPTION OF THE PREFERRED EMBODIMENT

Figure 1:
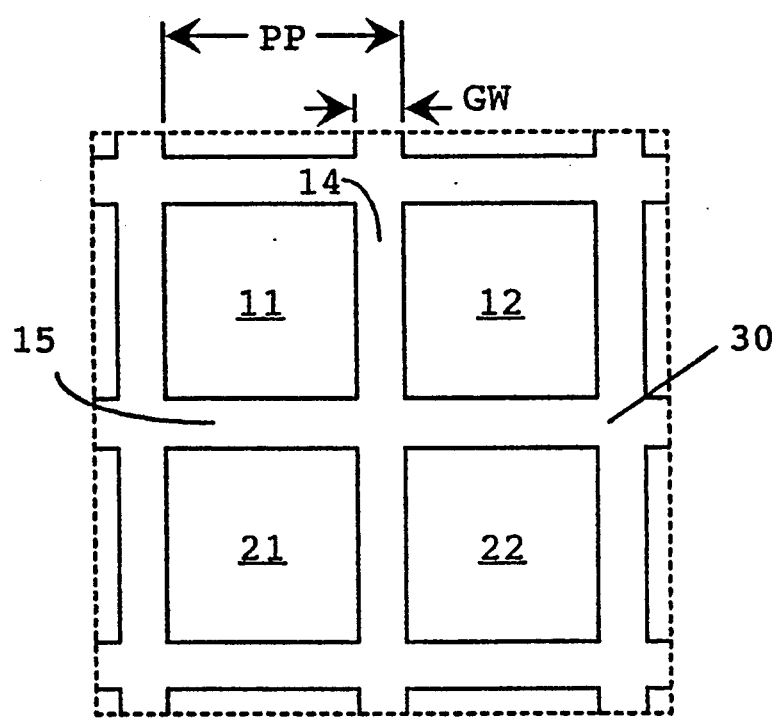
FIG. 1 illustrates an enlarged of a portion of a front plate of an active matrix liquid crystal display.

FIGS. 2A–2E and 3 illustrate, as an example, a preferred structure for practicing the various aspects of the present invention. In particular, the figures illustrate a top plan view and cross-sectional views of four reflective electrodes, 11, 12, 21 and 22, along with certain circuit elements formed beneath the four reflective electrodes for driving the four reflective electrodes. The figures are provided for illustrational purposes only, and are not intended to be drawn to scale nor laid out in any particular manner. Common reference numbers in the figures refer to the same elements being depicted.

Referring to the figures, drain (e.g., 112) and source (e.g., 114) regions for field effect transistors ("FETs") which control the activation of the reflective electrodes (11, 12, 21 and 22), substrate taps (e.g., 205) which provide connection points for ground buses (e.g., 104) to a silicon substrate (e.g., 70), and diffusion regions (e.g., 300) which act as collectors of photon- generated electrons are formed using conventional techniques in a top surface of the silicon substrate 70 (wherein it is to be understood that the area designated as silicon substrate 70 can also be a "well" or a "tub" as terms conventionally used in the art). In the preferred embodiment of the present invention, these drain (e.g., 112), source (e.g., 114), and diffusion (e.g., 300) regions are each n+ diffusions in a p-type substrate (e.g., 70), and the substrate tap (e.g., 205) regions are p+ diffusions in the p-type substrate (e.g., 70).

A field oxide layer 71 is then formed over the top surface of the silicon substrate 70. Using conventional techniques, the field oxide layer 71 is then selectively etched away over channel areas (e.g., 111) of the FETs, and a gate oxide layer 72 is then formed over these channel areas.

A polysilicon gate bus 108 (also referred to herein as a "row bus" or a "scanning electrode bus") is then formed along with polysilicon gate electrodes (e.g., 110) and polysilicon storage capacitor electrodes (e.g., 18) for each of the FETs. This is generally done by a conventional technique of depositing a layer of polysilicon material (also referred to as "polycrystalline silicon" material) over the field oxide layer 71 and the gate oxide layer 72, and then selectively removing portions of that layer of polysilicon material so as to leave behind the polysilicon gate bus 108, gate electrodes (e.g., 110), and storage capacitor electrodes (e.g., 18).

Another oxide layer 73 is then formed over the field oxide layer 71, polysilicon gate bus 108, gate electrodes (e.g., 110), and storage capacitor electrodes (e.g., 18). Using conventional techniques, a first plurality of holes (e.g., 113) is then formed in the oxide layers 71 and 73 which extend from the top of the oxide layer 73 down to the drain regions (e.g., 112) of the FETs, a second plurality of holes (e.g., 115) is formed in the oxide layers 71 and 73 which extend from the top of the oxide layer 73 down to the source regions (e.g., 114) of the FETs, a third plurality of holes (e.g., 119) is formed in the oxide layer 73 which extend from the top of the oxide layer 73 down to the polysilicon storage capacitor electrodes (e.g., 18), a fourth plurality of holes (e.g., 203) is formed in the oxide layers 71 and 73 which extend from the top of the oxide layer 73 down to the substrate taps (e.g., 205), 15 and a fifth plurality of holes (e.g., 201) is formed in the oxide layers 71 and 73 which extend from the top of the oxide layer 73 down to the diffusion or "guard-band" regions (e.g., 300).

Signal electrode buses (e.g., 100), power supply buses (e.g., 102), and ground buses (e.g., 104) (wherein all three buses are also referred to herein generically as "column buses", and the power supply buses and ground buses are also referred to herein generically as "power buses") and light shields (e.g., 16) are formed using conventional metallization techniques, along with contacts (e.g., 200) which connect the signal electrode buses (e.g., 100) to their respective FET drain regions (e.g., 112), contacts (e.g., 202) which connect the power supply buses (e.g., 102) to their respective diffusion regions (e.g., 300), contacts (e.g., 204) which connect the ground buses to the substrate taps (e.g., 205) formed on the surface of the silicon substrate 70, contacts (e.g., 116) which connect the light shields (e.g., 16) to their respective FET source regions (e.g., 114), and contacts (e.g., 120) which connect the light shields (e.g., 16) to their respective polysilicon storage capacitor electrodes (e.g., 18).

With the polysilicon storage capacitor electrodes (e.g., 18) thus electrically connected to the source regions (e.g., 114) of their respective FETs through their respective light shields (e.g., 16), and the silicon substrate 70 thus connected to the ground bus (e.g., 104), the storage capacitors are completed whereby the grounded silicon substrate 70 acts as a second electrode for each of the storage capacitors and the field oxide layer 71.

Figure 2A:
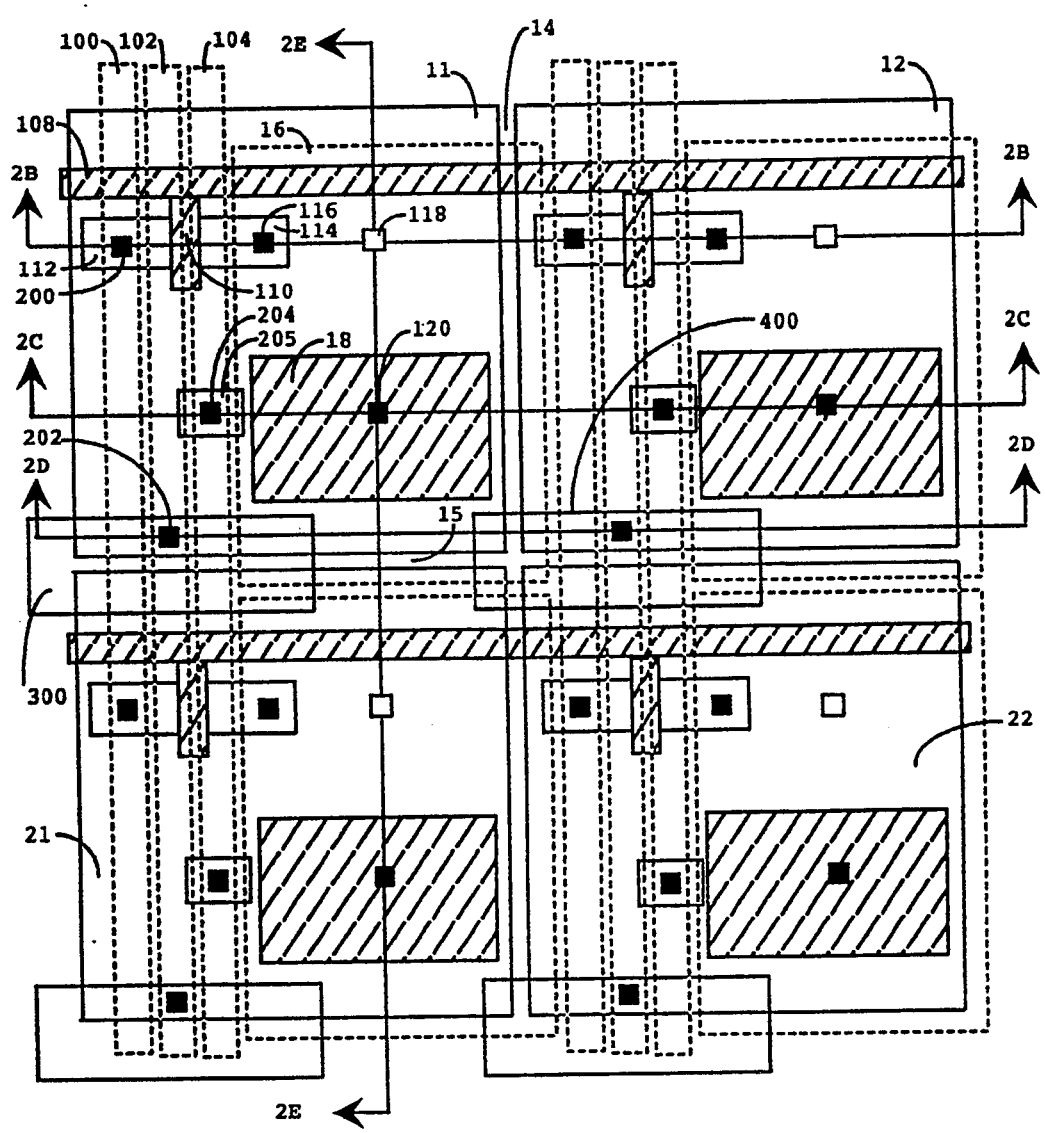
Figure 2B:
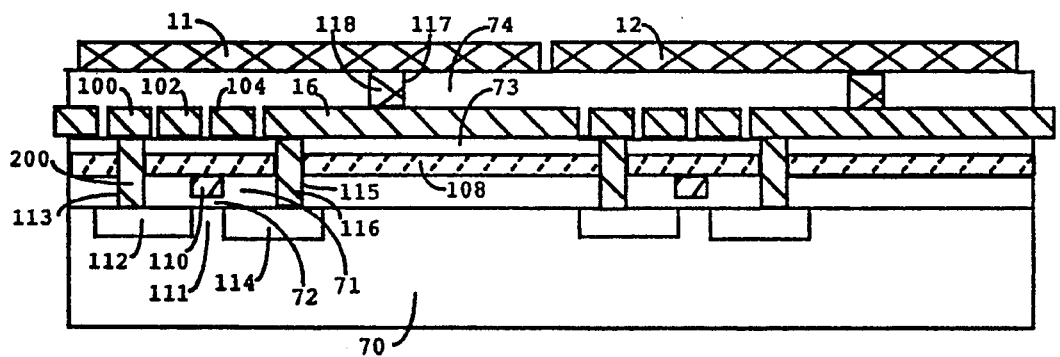
Figure 2C:
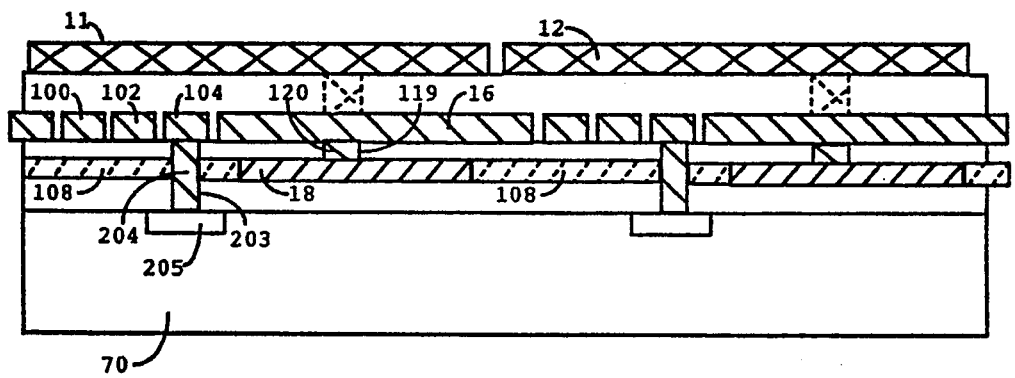
Figure 2D:
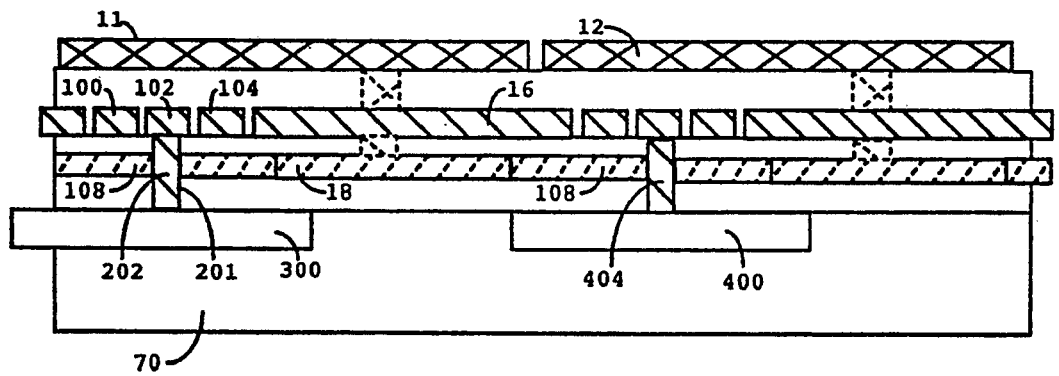
Figure 2E:
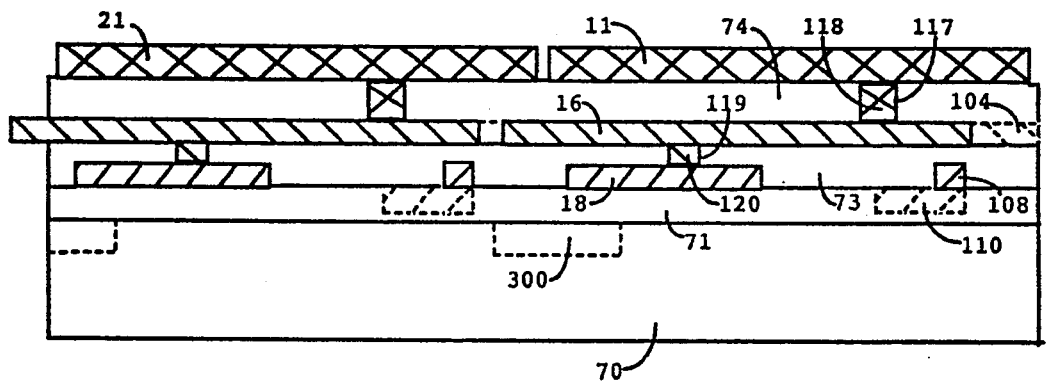

Referring in particular to FIG. 2A, the column buses (e.g., 100, 102 and 104) are shown as three dotted rectangular strips running along each column of reflective electrodes (e.g., 11 and 21), and each light shield (e.g., 16) associated with each reflective electrode (e.g., 11) is shown as a dotted rectangular box which is spatially offset from its respective reflective electrode (e.g., 11) such that it extends under adjacent reflective electrodes (e.g., 12, 21 and 22) and as a consequence, shields substantial portions of the silicon substrate 70 lying directly under gaps (e.g., 14 and 15) formed between two (e.g., 12 and 21) of these three adjacent reflective electrodes and the reflective electrode (e.g., 11) associated with the light shield (e.g., 16), from incident light passing through these gaps (e.g., 14 and 15) to the silicon substrate 70.

Figure 3:
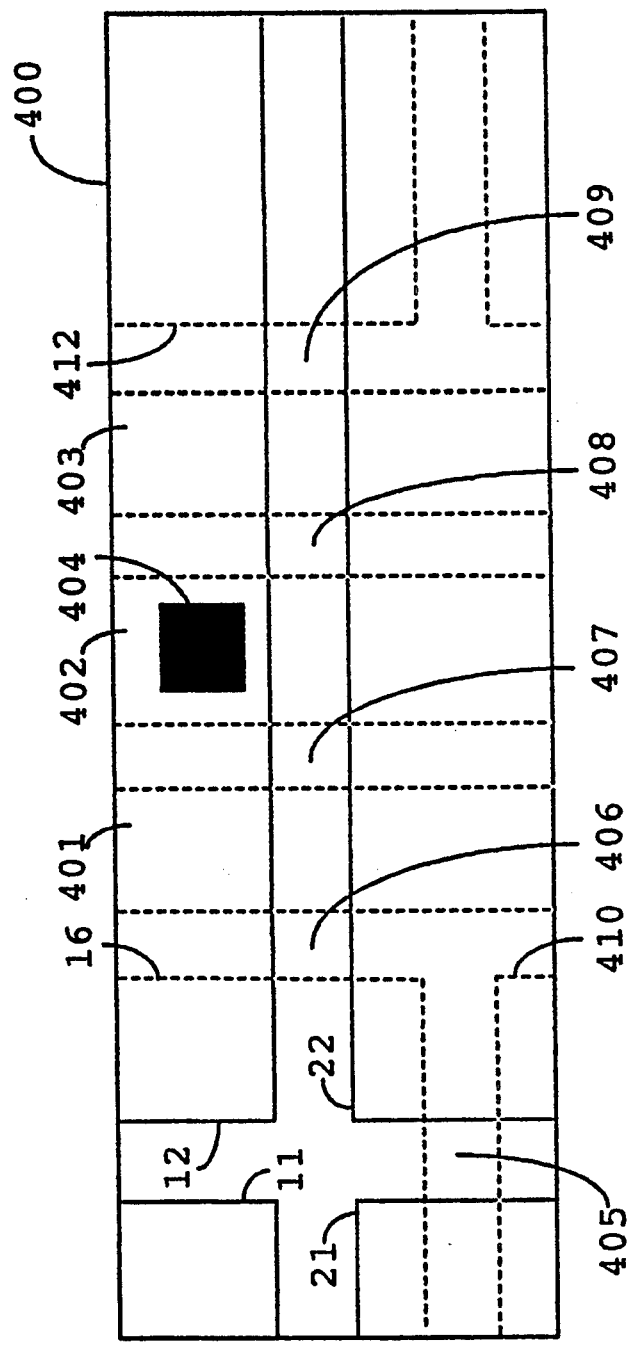
FIG. 3 illustrates an enlarged top plan view of a portion of the back plate designated as the diffusion region 400 in FIG. 2A.

Referring now to FIG. 3, several gap areas (e.g., 405–409) are left unshielded even with the off-set array scheme as described above. Some of the unshielded gap areas occur because gaps are necessarily formed between adjacent light shields for the same reasons that they occur between adjacent reflective electrodes, i.e., design and/or manufacturability restraints. Consequently, when the gap areas between adjacent light shields (e.g., 16 and 410) intersect with gap areas between adjacent reflective electrodes (e.g., 21 and 22), unshielded gap areas (e.g., 405) result. Others of the unshielded gap areas occur because gaps (e.g., 406) are necessarily formed between light shields (e.g., 16) and adjacent column buses (e.g., 401), and still others of the unshielded gap areas occur because gaps (e.g., 407) are necessarily formed between adjacent column buses (e.g., 401 and 402). Each of these other gap areas occur for the same reasons that they occur between adjacent reflective electrodes.

To protect the circuitry formed on the silicon substrate 70 from electrons being generated by photons of light passing through the above described unshielded gap areas (e.g., 405–409) and striking the silicon substrate 70, positively biased diffusion areas (e.g., 400) preferably formed directly under the unshielded gap areas (e.g., 405–409) act as electron "collectors" while the grounded silicon substrate 70 acts as a hole "collector." In the preferred embodiment, the power supply buses (e.g., 402) are connected to their respective n+ diffusion areas (e.g., 400) and the ground buses (e.g., 403) to their respective p+ substrate taps formed on the surface of the p-type silicon substrate 70. Thus, when photons of light strike the surface of the silicon substrate 70 at or near the n+ diffusion areas (e.g., 400), the generated electrons flow toward the n+ diffusion areas (e.g., 400) and the generated holes flow into the p-type substrate. Thus, the strategically placed and positively biased, diffusion or "guard-band" regions (e.g., 400) act to prevent any electrons from being collected by the positively charged pixel storage capacitors through the source regions of their respective FETs, which collection would cause the positively charged pixel storage capacitors to discharge.

Now referring back to FIGS. 2A–2E, another oxide layer 74 is then formed over the oxide layer 73, as well as over the column buses (e.g., 100, 102 and 104) and light shields (e.g., 16). Using conventional techniques, a sixth plurality of holes (e.g., 117) is then formed in the oxide layer 74 which extend from the top surface of the oxide layer 74 down to the light shields (e.g., 16).

Reflective electrodes (e.g., 11) are then formed using conventional metallization techniques, along with vias (e.g., 118) which connect each of the reflective electrodes (e.g., 11) to its respective light shield (e.g., 16) which in turn, is connected through contacts (e.g., 116 and 120) to the source regions (e.g., 114) of the FETs and storage capacitor electrodes (e.g., 18), respectively, which are associated with that reflective electrode (e.g., 11).

Although only a few representative reflective electrodes and their related drive circuitry have been shown in FIGS. 2A–2E, it is to be understood that active matrix liquid crystal displays may readily have hundreds of thousands of such reflective electrodes organized in a matrix of rows and columns. Accordingly, the structures and patterns shown for the illustrative reflective electrodes may readily be replicated for forming other reflective electrodes in such matrices.

Although the various aspects of the present invention have been described with respect to a preferred embodiment, it will be understood that the invention is entitled to full protection within the full scope of the appended claims. For example, one skilled in the art can readily appreciate that the various aspects of the present invention could also be used with a process comprising an n-type substrate, as well as the p-type described in the preferred embodiment of the invention. For example, if an n-type substrate was used, the source and drain regions of the FETs, as well as the "guard-band" regions would each be p+ diffusion regions in an n-type substrate (as opposed to n+ diffusion regions in a p-type substrate, as described in the preferred embodiment), and the p+ "guard-band" region would be negatively biased by connecting a ground bus to it, and the n-type substrate would be positively biased by connecting the power supply to it.

Also, as shown in FIGS. 4A-4B, for examples, other spatial arrangements between the column buses (e.g., 1010, 1020, 1030, etc.), light shields (e.g., 11″, 12″, 21″ and 22″), , reflective electrodes (e.g., 11′, 12′, 21′ and 22′), and positively biased diffusion areas (e.g., 3000 or 3010 and 3020) are contemplated, and are thus entitled to full protection within the full scope of the appended claims.

Whereas the preferred embodiment as described in reference to FIGS. 2A-2E utilizes light shields (e.g., 16) which each extend into four adjacent gaps formed by three reflective electrodes (e.g., 12, 21 and 22) which are adjacent to the reflective electrode (e.g., 11) which corresponds to that light shield (i.e., a reflective electrode which is electrically connected to that light shield through a common source region, e.g., 114) to shield the substrate 70 from incident light, one alternative embodiment shown in FIG. 4 utilizes column buses (e.g., 1020) to shield the substrate 70 under column gaps (e.g., 14′) formed between adjacent reflective electrodes (e.g., 11′ and 12′), and light shields (e.g., 11″) to shield the substrate 70 under row gaps (e.g., 15′) formed between adjacent reflective electrodes (e.g., 11′ and 21′).

Continuing with FIG. 4A, gap areas (e.g., 2010 and 2020) which are not shielded from incident light by either the reflective electrodes (e.g., 11′, 12′, 21′ and 22′), the light shields (e.g., 11″ and 12″), or the column buses (e.g., 1020) have positively biased diffusion regions (e.g., 3000) formed thereunder on the surface of the silicon substrate 70, wherein unlike the preferred embodiment which formed a plurality of such positively biased diffusion regions along a gap row between adjacent rows of reflective electrodes, the alternative embodiment shown in FIG. 4A shows a single diffusion region (e.g., 3000) formed along a gap row between adjacent rows of reflective electrodes. One advantage for having a single positively biased diffusion region for each gap row (e.g., 3000) is that less power supply buses are required, i.e., each column of reflective electrodes does not require a power supply bus.

Referring now to FIG. 4B, still another configuration for forming the positively biased diffusion regions is shown. In this alternative embodiment, the positively biased diffusion regions (e.g., 3010 and 3020) are shown not to be directly under the gap areas (e.g., 2010 and 2020) left unshielded by the reflective electrodes (e.g., 11′ and 12′), the column buses (e.g., 1020), and the light shields (e.g., 11″ and 12″). In this alternative embodiment, the positively biased diffusion regions (e.g., 3010 and 3020) are shown to be "near" the gap areas (e.g., 2010 and 2020) and "between" the gap areas (e.g., 2010 and 2020) and FETs (e.g., 4010 and 4020) which respectively correspond to the reflective electrodes (e.g., 12′ and 22′, respectively). When photons of light passing through the gap areas (e.g., 2010 and 2020) then strike the silicon substrate 70, one positively biased diffusion region (e.g., 3010) "collects" any photon-generated electrons traveling towards one of the FETs (e.g., 4010) and the other positively biased diffusion region (e.g., 3020) "collects" any photon-generated electrons traveling towards one of the other FETs (e.g., 4020). The grounded substrate 70 "collects" any photon-generated holes as previously described in reference to the preferred embodiment of FIGS. 2A-2B and 3.

One problem with the alternative positively biased diffusion regions (e.g., 3010 and 3020) as shown in FIG. 4B is that some photon-generated electrons might travel under the diffusion regions (e.g., 3010 and 3020) and as a consequence, affect the proper operation of the FETs and storage capacitors associated with each of the reflective electrodes. Thus, in order to practice this alternative embodiment, some experimentation may be required to determine the optimal trade-offs between how "near" the positively biased diffusion regions (e.g., 3010 and 3020) must be to the unshielded gap areas (e.g., 2010 and 2020) and how "deep" these positively biased diffusion regions must be in order to prevent too many electrons from tunneling under them and reaching the FETs.

What is claimed is:

1. In an active matrix liquid crystal display, a back plate structure formed on a planar surface of a silicon substrate to shield a portion of said planar surface of said silicon substrate from incident light, comprising:

a first plurality of reflective electrodes organized in a first array of rows and columns on a first planar surface substantially parallel to said planar surface of said silicon substrate and lying above said planar surface, said first array of reflective electrodes having a gap between each pair of adjacent reflective electrodes in said first array; and a second plurality of reflective electrodes equal in number to said first plurality of reflective electrodes and organized in a second array of rows and columns on a second planar surface substantially parallel to said planar surface of said silicon substrate and lying between said first planar surface of said first array and said planar surface of said silicon substrate;

wherein said second array of reflective electrodes is positioned relative to said first array of reflective electrodes in an offset manner such that a portion of each of said second plurality of reflective electrodes is directly under portions of at least one gap in said first array so as to shield said portion of said planar surface of said silicon substrate from incident light.

2. The back plate structure as recited in claim 1, further comprising:

a plurality of field effect transistors, each of said field effect transistors having a source region and a drain region formed on said planar surface of said silicon substrate;

wherein the source region of each of said plurality of field effect transistors is electrically connected to one of said first plurality of reflective electrodes and one of said second plurality of reflective electrodes.

3. The back plate structure as recited in claim 2, further comprising:
   a plurality of display signal buses formed on said second planar surface of said second array of reflective electrodes, each of said plurality of display signal buses running parallel to an associated column of said second array of reflective electrodes, and running adjacent to said associated column of said second array of reflective electrodes;
   wherein said each of said plurality of display signal buses is electrically connected to the drain regions of each of the field effect transistors in said associated column of said second array of reflective electrodes.

4. The back plate structure as recited in claim 3, further comprising:
   a plurality of diffusion regions having surface areas formed on said planar surface of said silicon substrate, where said surface areas of said plurality of diffusion regions are intersected by substantially all lines normal to said planar surface of said silicon substrate which extend through the gaps of both said first and second arrays of reflective electrodes;
   a plurality of power supply buses formed on said second planar surface of said second array of reflective electrodes, said plurality of power supply buses running parallel to said plurality of display signal buses; and
   a plurality of ground buses formed on said second planar surface of said second array of reflective electrodes, said plurality of ground buses running parallel to said plurality of display signal buses;
   wherein each of said plurality of diffusion regions is electrically connected to one of said plurality of power supply buses, and each of said plurality of ground buses is electrically connected to said planar surface of said silicon substrate.

5. The back plate structure as recited in claim 4, wherein said plurality of diffusion regions, said plurality of drain regions, and said plurality of source regions comprise a n+ diffusion, and said silicon substrate comprises an p-type diffusion.

6. The back plate structure as recited in claim 3, wherein said first plurality of reflective electrodes, said second plurality of reflective electrodes, and said plurality of display signal buses are comprised of a metal.

7. The back plate structure as recited in claim 1, wherein said second array of reflective electrodes is positioned relative to said first array of reflective electrodes in an offset manner such that a portion of each of said second plurality of reflective electrodes is directly under portions of four adjacent gaps in said first array so as to shield said portion of said planar surface of said silicon substrate from incident light.

8. The back plate structure as recited in claim 1, further comprising a plurality of column buses formed on said second planar surface of said second array of reflective electrodes, each of said plurality of column buses running parallel to an associated column of said second array of reflective electrodes, and running substantially directly under a column of gaps in said first array so as to shield a portion of said planar surface of said silicon substrate from incident light.

9. A method of forming a back plate structure for an active matrix liquid crystal display, comprising the steps of:
   forming, on a planar surface of a silicon substrate, a plurality of diffusion regions;
   forming, on a second planar surface, a plurality of power buses including a plurality of power supply buses and a plurality of ground buses extending parallel to each other and a first plurality of gaps which electrically isolate each of said plurality of power buses from adjacent power buses;
   electrically connecting a first portion of each of said plurality of power buses to one of said plurality of diffusion regions, and a second portion of each of said plurality of power buses to said planar surface of silicon substrate; and
   forming, on a third planar surface substantially parallel to and lying above said second planar surface, a plurality of reflective electrodes organized in an array of rows and columns, and a second plurality of gaps which electrically isolate adjacent reflective electrodes from each other;
   wherein said first and second plurality of gaps forming steps comprise the step of positioning said first plurality of gaps on said second planar surface and said second plurality of gaps on said third planar surface such that substantially all lines normal to said second and third planar surfaces that pass through both said first and second plurality of gaps also pass through said plurality of diffusion regions.

10. The method as recited in claim 9, further comprising the steps of:
    forming, on said second planar surface, a plurality of light shields organized in an array of rows and columns wherein said first plurality of gaps electrically isolate each of said plurality of power buses from adjacent power buses, and electrically isolate each of said plurality of light shields from adjacent light shields and from adjacent power buses.

11. The method as recited in claim 10, further comprising the step of electrically connecting each of said plurality of source regions to one of said plurality of light shields and one of said plurality of reflective electrodes.

12. The method as recited in claim 9, wherein said plurality of diffusion regions forming step comprises the step of forming a plurality of n+ diffusion regions, said plurality of power buses forming step comprises the steps of forming a plurality of power supply buses and a plurality of ground buses, and said electrically connecting step comprises the steps of electrically connecting each of said power supply buses to one of said plurality of n+ diffusion regions and electrically connecting each of said ground buses to said planar surface of said silicon substrate.

13. The method as recited in claim 9, wherein said plurality of diffusion regions forming step comprises the step of concurrently forming, on said planar surface of said silicon substrate, a plurality of source regions and said plurality of diffusion regions.

14. A method of forming a back plate structure for an active matrix liquid crystal display, comprising the steps of:
    forming, on a planar surface of a silicon substrate, a plurality of source regions;
    forming, on a second planar surface substantially parallel to and lying above said planar surface of said silicon substrate, a plurality of light shields organized in an array having gaps between adjacent light shields;

forming, on a third planar surface substantially parallel to and lying above said second planar surface, a plurality of reflective electrodes organized in an array having gaps between adjacent reflective electrodes;

electrically connecting each of said plurality of source regions to one of said plurality of reflective electrodes and one of said plurality of light shields; and wherein said plurality of light shields and plurality of reflective electrodes forming steps include the steps of positioning said array of light shields and array of reflective electrodes in an offset manner with respect to each other such that a part of each of said plurality of light shields is directly under portions of at least one gap in said array of reflective electrodes so as to shield a portion of said planar surface of said silicon substrate from incident light.

15. The method as recited in claim 14, further comprising the step of forming, on said second planar surface, a plurality of column buses having gaps between adjacent column buses, wherein said plurality of column buses and plurality of reflective electrodes forming steps include the steps of positioning said plurality of column buses and array of reflective electrodes in an offset manner with respect to each other such that a part of each of said plurality of column buses is directly under portions of at least one gap in said array of reflective electrodes so as to shield a portion of said planar surface of said silicon substrate from incident light.

16. The method as recited in claim 14, wherein said array of light shields and array of reflective electrodes positioning steps comprise the steps of positioning said array of light shields and array of reflective electrodes in an offset manner with respect to each other such that a part of each of said plurality of light shields is directly under portions of four adjacent gaps in said array of reflective electrodes so as to shield a portion of said planar surface of said silicon substrate from incident light.

* * * * *